United States Patent Office 3,405,175
Patented Oct. 8, 1968

---

3,405,175
TRIAMINOGUANIDINIUM DICYANAMIDE
Dorothy Ann Carvalho, Bridgeport, and Stanley Frank Stafiej, Stamford, Conn., assignors to American Cyanamid Company, Stamford, Conn., a corporation of Maine
No Drawing. Filed Apr. 12, 1966, Ser. No. 543,486
1 Claim. (Cl. 260—551)

This invention relates to triaminoguanidinium dicyanamide, i.e.,

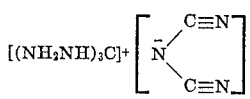

and propellant compositions produced therefrom.

It has been found that triaminoguanidinium dicyanamide can be prepared in high yield by reacting the free base, triaminoguanidine, with one-half equivalent of sulfuric acid to form triaminoguanidinium sulfate which in turn is reacted with calcium dicyanamide, either as a solid or in an aqueous suspension. The resultant insoluble calcium sulfate is filtered off and the filtrate is evaporated to dryness. Triaminoguanidinium dicyanamide is then recrystallized from hot propanol. The reaction proceeds as follows:

(1) $2(H_2NNH)_2C=NNH_2 + H_2SO_4 \rightarrow$
$[C(NHNH_2)_3]_2SO_4$ (2) $[C(NHNH_2)_3]_2SO_4 + Ca[N(CN)_2]_2 \rightarrow$
$2[(NHNH_2)_3C][N(CN)_2] + CaSO_4$ The triaminoguanidine should preferably be weighed out in a dry box in an inert atmosphere or washed with methanol to remove color, if necessary. If the triaminoguanidine is colored, it preferably should be washed with methanol until the solid is white before proceeding with the reaction.

The following example is set forth for purposes of illustration only and is not to be construed as limiting the instant invention except as set forth in the appended claims. All parts and percentages are by weight unless otherwise specified.

Example 1.—Preparation of triaminoguanidinium dicyanamide 14.57 parts of triaminoguanidine are washed with absolute methanol until the washings are colorless. The white triaminoguanidine is dissolved in water and a one molar sulfuric acid-water solution is added until the pH of the solution is approximately five. An aqueous solution containing 12.2 parts of calcium dicyanamide, is added slowly with stirring. Immediately a solid is precipitated from solution. The calcium sulfate is removed by filtration, and the filtrate is then stripped to dryness on a rotary evaporator using vacuum. 22.9 parts (95.5%) of triaminoguanidinium dicyanamide is recovered by recrystallization from hot propanol. After three recrystallizations, M.P. 123.5–124.5° C.

*Analysis.*—Calculated for $C_3H_9N_9$: C, 21.05; H, 5.30; N, 73.65. Found: C, 21.29; H, 5.57; N, 73.45. Density: 1.415 g./cc. at 25° C. Thermal gravimetric analysis—sharp weight loss at 160° C. (rate=10°/min.). Differential thermal analysis—sharp endotherm 123° C.; sharp exotherm 150° C. (rate=6°/min.).

The triaminoguanidinium dicyanamide possesses properties which make it highly useful as a component in both solid and hybrid rocket propellant fuel compositions. For example, it combines the properties of high stability to air and water with a large gas-forming capability, thereby resulting, when mixed with various oxidizers, etc., in a satisfactory propellant. It has a high nitrogen content and shows no measurable impact or electrical sensitivity. It has a heat of formation of +95.5±1.8 kcal./mole and is nonhygroscopic.

The relative stability of triaminoguanidinium dicyanamide makes it more desirable as a high nitrogen additive than other compounds used previously and it is comparable to known additives in its gas-forming capability.

The triaminoguanadinium dicyanamide can be employed as an ingredient in propellant compositions in accordance with general procedures, well known to those skilled in the art. Conventional oxidizers such as nitric acid, oxygen, ammonium perchlorate, potassium perchlorate, sodium perchlorate, ammonium nitrate, etc., may be used. One would generally use from about 1–35% of the dicyanamide in the composition in finely divided form. Examples of the artificial binders which may be used include polybutadiene-carboxylic acids, nitrocellulose, polyesters, polyurethanes, and the like. These binders are generally used in amounts ranging from about 20–40%, by weight, based on the weight of the oxidizer and dicyanamide. Additionally, one can add such fuels as aluminum, beryllium, boron and the like to the propellant compositions. Further details concerning the production and formulation of such compositions can be found in U.S. Patents Nos. 2,622,277, 2,646,596, and 3,132,978, which patents are hereby incorporated herein by reference.

We claim:
1. The compound triaminoguanidinium dicyanamide.

References Cited

UNITED STATES PATENTS 2,768,888  10/1956  Ryker _____ 149—36

HENRY R. JILES, *Primary Examiner.*

H. I. MOATZ, *Assistant Examiner.*